Sept. 17, 1963 E. P. McGROGAN, JR 3,104,343

CHARACTERISTIC ASCERTAINING CIRCUIT

Filed Nov. 29, 1960

INVENTOR.
ELLWOOD P. McGROGAN, JR.
BY Morris L. Rabkin
ATTORNEY

United States Patent Office
3,104,343
Patented Sept. 17, 1963

3,104,343

CHARACTERISTIC ASCERTAINING CIRCUIT

Ellwood P. McGrogan, Jr., West Chester, Pa., assignor to Radio Corporation of America, a corporation of Delaware Filed Nov. 29, 1960, Ser. No. 72,431
6 Claims. (Cl. 315—23)

Figure 1:
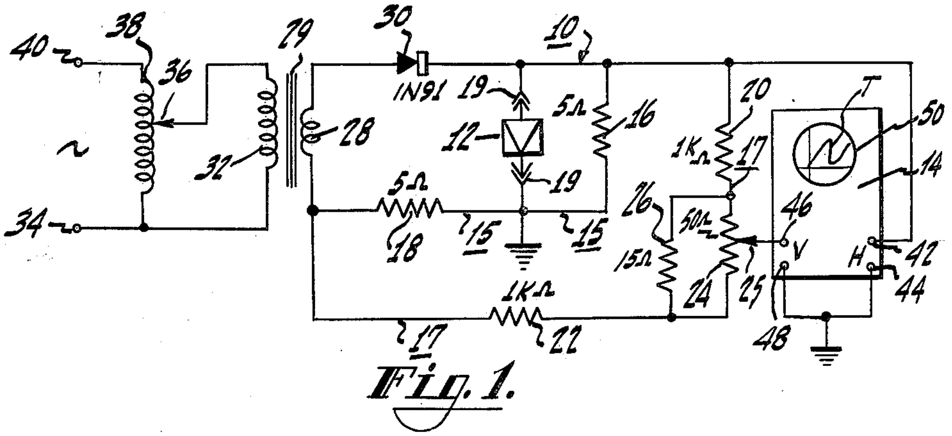

This invention relates generally to circuits for ascertaining dynamic characteristics of a component, and more particularly to an improved circuit for obtaining the V-I (voltage-ampere) characteristic of components that have negative resistance parameters. The circuit of the present invention is particularly useful for displaying the V-I characteristic of a tunnel diode on an oscilloscope.

One of the most useful pieces of information about a tunnel diode is a knowledge of its V-I characteristic. The V-I characteristic helps to provide an understanding of the physical mechanism involved in the tunnel diode's operation. However, the tracing of the V-I characteristic of a tunnel diode in its negative-resistance region of operation is not easily achieved with prior art curve-tracing circuits. Undesired oscillations are usually produced in these prior art circuits by the tunnel diode, and these oscillations obscure the characteristic curve in the negative-resistance region. Also, in prior art curve-tracing circuits, the sampling resistor that samples current through the tunnel diode must have a lower resistance than the tunnel diode itself. This requirement usually makes it necessary to use sampling resistors having a value of resistance of less than one ohm. Consequently, such prior art curve-tracing circuits require a substantial amount of amplification before applying signals to the vertical-deflection input terminals of an oscilloscope.

Accordingly, it is an object of the present invention to provide an improved circuit which provides signals that do not require extraordinary amplification before being applied to an oscilloscope for display purposes.

It is another object of the present invention to provide an improved curve-tracing circuit wherein undesired oscillations caused by the negative resistance parameters of components under test, are suppressed.

It is another object of the present invention to provide an improved curve-tracing circuit that is relatively simple in structure, very reliable in operation, and highly efficient in use.

In accordance with the present invention, the improved characteristic ascertaining circuit comprises a bridge network having two branches connected in parallel with each other. Each of the branches comprises a different pair of serially connected impedance elements. The component whose V-I characteristic is to be displayed on an oscilloscope is connected across one of the impedance elements. The impedance element in shunt with the component should have a lower resistance than the minimum absolute value of negative resistance of the component. In other words, the sum of the conductances of the component and the impedance element connected in shunt with it should always be greater than zero to prevent unwanted oscillations in the curve-tracing circuit. Varying, unidirectional voltage pulses are caused to sweep across the network branches. The voltage across the component is also applied to the horizontal-deflection input terminals of the oscilloscope, and the junctions of the impedance elements in the respective branches are connected to the vertical-deflection input terminals of the oscilloscope. With the component under test disconnected from the circuit, the curve-tracing circuit is balanced by adjusting the voltages between the common junctions of the impedance elements in each branch of the network to equal each other. Under this condition, only a horizontal tracing is obtained on the oscilloscope. When the component is connected across one of the impedance elements, the curve-tracing circuit is unbalanced, and signals resulting from current flowing through the component are applied to the vertical-deflection input terminals of the oscilloscope. Under this condition, the oscilloscope displays the V-I characteristic of the component.

Figure 2:
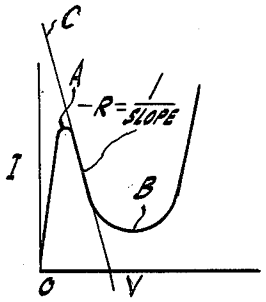

The novel features of the present invention both as to its organization and method of operation, as well as additional objects and advantages thereof, will be more readily understood from the following description, when read in connection with the accompanying drawing, in which:

FIG. 1 is a schematic diagram of a curve-tracing circuit for displaying the V-I characteristic of a tunnel diode on an oscilloscope in accordance with the present invention; and FIG. 2 is a typical curve illustrating the V-I characteristic of a tunnel diode.

Referring, now, to FIG. 1 of the drawing, there is shown a curve-tracing circuit 10 for displaying the V-I characteristic of a tunnel diode 12 on an oscilloscope 14. The circuit 10 comprises a bridge network of impedance elements including two parallel branches 15 and 17. The branch 15 comprises serially connected resistors 16 and 18, and the branch 17 comprises resistors 20 and 22 connected to each other through the resistor 24 of a potentiometer. Resistor 24 is shunted by a resistor 26 of relatively low resistance. The tap 25 of the potentiometer comprises means for dividing the branch 17 into a ratio of two resistances that is substantially equal to the ratio of the resistances of the resistors 16 and 18 in the branch 15. The branches 15 and 17 are connected in parallel. All of the resistors should be preferably of the non-inductive type.

The tunnel diode 12 is connected in shunt with the resistor 16 through suitable contact means, such as male and female sliding contacts 19, so that the tunnel diode 12 may be easily inserted or removed, when desired. The common junction of the resistors 16 and 18 is connected to a common connection, such as ground.

Means are provided to apply varying, repetitive, unidirectional voltage pulses across the tunnel diode 12 to cause current to flow periodically therethrough. To this end, the secondary 28 of a step-down transformer 29, such as a 6.3 volt filament transformer, has one end connected directly to the common junction of the resistors 18 and 22, and the other end connected to the common junction of the resistors 16 and 20 through a diode 30. The diode 30 and the tunnel diode 12 are both poled in the same direction.

The primary 32 of the transformer 29 has one end connected to an input terminal 34, and another end connected to a variable tap 36 of an auto-transformer 38. One end of the auto-transformer 38 is connected to the input terminal 34, and the other end is connected to an input terminal 40. The input terminals 34 and 40 comprise means for applying a conventional source of A.-C. (alternating-current) power to the circuit 10.

The oscilloscope 14 is a conventional oscilloscope, preferably a D.-C. (direct-current) oscilloscope, having a pair of horizontal-deflection input terminals 42 and 44, and a pair of vertical-deflection input terminals 46 and 48. The horizontal-deflection input terminal 44 and the vertical-deflection input terminal 48 are connected to each other and to the common connection. The horizontal-deflection input terminal 42 is connected to the common junction between the resistors 16 and 20, and the tap 25 of the potentiometer is connected to the vertical-deflection input terminal 46.

Referring, now, to FIG. 2 of the drawing, there is shown the forward V-I characteristic of a typical tunnel diode. From an examination of this characteristic curve, it will be observed that, as the voltage across the tunnel diode increases, the current increases to a sharp maximum value A, drops to a broad minimum value B, and then increases again. The line C is drawn through the forward characteristic, i.e., at the point of, and with the slope of, the numerically greatest negative slope. The reciprocal of the slope of the line C is the negative resistance, —R, of the tunnel diode.

The operation of the curve-tracing circuit 10 for tracing the V-I characteristic of the tunnel diode 12 on the cathode-ray tube 50 of the oscilloscope 14 will now be explained. The tunnel diode 12 is removed from the circuit 10 and the circuit 10 is balanced, as follows: The A.-C. voltage applied between the input terminals 34 and 40 is stepped down by the transformers 38 and 29, and then applied across the diode 30. The diode 30 rectifies the stepped down A.-C. voltage and applies varying, unidirectional, half-wave pulses across the branches 15 and 17. The voltage pulses normally applied across the tunnel diode 12 are also applied to the horizontal-deflection input terminals 42 and 44. The voltages at the common connection, or ground, and at the tap 25 are made equal to each other by adjusting the tap 25 (with the tunnel diode 12 removed from the circuit 10). Thus, when the voltage at the tap 25 is equal to that at the common connection, only a horizontal line is seen on the oscilloscope 14. The tunnel diode 12 is then connected in shunt with the resistor 16 through the contacts 19. A trace T, the V-I characteristic of the tunnel diode 12, now appears on the oscilloscope 14.

The voltage drops across the resistor 16 is proportional to the current through it, but the voltage drop across the resistor 18 is proportional to the sum of the current through the resistor 16 and the current through the tunnel diode 12. Since the voltage drops across the resistors 16 and 18 are of opposite polarity with respect to the common connection, or ground, their difference is proportional to the current through the tunnel diode. This difference in voltage (or a voltage proportional to this difference) is obtained from the resistive adder circuit comprising the branch 17, that is, the resistors 20, 22 and the balance-adjusting resistors 24 and 26. Thus, by balancing the bridge circuit 10 for zero vertical deflection on the oscilloscope 14 when the tunnel diode 12 is removed from the circuit, the vertical deflection that results when the tunnel diode 12 is inserted in the circuit 10 is due to the current through the tunnel diode 12. Each of the resistors 20 and 22 should have a value of resistance that is large with respect to the source impedance and small with respect to the input impedance of the oscilloscope 14.

With the values of the components indicated in FIG. 1 of the drawing, the output to the vertical channel of the oscilloscope is 2.5 millivolts per milliampere of diode current. Hence, the circuit 10 is capable of displaying a current of as low as 0.4 milliampere per centimeter on an oscilloscope having a maximum sensitivity of 1 millivolt per centimeter. The circuit 10 may, therefore, be connected directly to the oscilloscope 14 without any intermediate stages of amplification, the amplifiers in most conventional oscilloscopes being sufficient for an adequate display. Hence, no calibration of the display is necessary if the oscilloscope has calibrated deflection sensitivities.

From the foregoing description, it will be apparent that there has been provided an improved curve-tracing circuit for displaying the V-I characteristics of components on an oscilloscope. The values of the components indicated on the drawing are illustrative of only one embodiment of the improved curve-tracing circuit and are not to be considered in a limiting sense. Although the curve-tracing circuit has been described and illustrated for producing the V-I characteristic of a tunnel diode, it will be understood that other, two-terminal components having V-I characteristics may also be tested by this circuit. Since variations of the improved curve-tracing circuit coming within the spirit of the invention will, no doubt, readily suggest themselves to those skilled in the art, it is desired that the foregoing description of the invention shall be considered illustrative and not in a limiting sense.

What is claimed is:

1. A circuit for displaying the voltage-ampere characteristic curve of a component on an oscilloscope having a first pair of deflection input terminals and a second pair of deflection input terminals, said component having a negative resistance characteristic, said circuit comprising a network having two branches connected in parallel, each of said branches comprising a pair of serially connected impedance elements, means to apply a varying unidirectional voltage across said branches, means to connect said component in shunt with one impedance element of one of said pairs of impedance elements, said one impedance element having a smaller value of impedance than the minimum absolute value of negative resistance of said component, means to connect the common junction of said impedance elements in said one pair of impedance elements to one terminal of said first pair of deflection input terminals and to one terminal of said second pair of deflection input terminals, means to connect the common junction of said impedance elements in said other pair of impedance elements to the other terminal of said second pair of deflection input terminals, and means to connect said voltage applying means to the other terminal of said first pair of deflection input terminals, whereby said oscilloscope can display the voltage-ampere characteristic curve of said component.

2. A circuit as defined in claim 1 wherein said impedance elements of said other pair of impedance elements are connected to each other through a resistor, and wherein a tap of said resistor comprises said means to connect said common junction of said impedance elements in said other pair of impedance elements to said other terminal of said second pair of deflection input terminals.

3. A circuit as defined in claim 1 wherein the ratio of the impedances of said impedance elements in said one pair of impedance elements is substantially equal to the ratio of the impedances of said impedance elements in said other pair of impedance elements.

4. A circuit as defined in claim 1 wherein said impedance elements in said one pair of serially connected impedance elements are equal to each other, and said impedance elements in said other pair of impedance elements are equal to each other, the value of impedance of each of said impedance elements in said other pair of impedance elements being relatively much greater than the value of impedance of each of said impedance elements in said one pair of impedance elements.

5. A curve-tracing circuit for displaying a characteristic of a component on an oscilloscope, said component having a negative resistance characteristic, said oscilloscope having two horizontal-deflection input terminals and two vertical-deflection input terminals, said circuit comprising a network having two branches connected in parallel, one of said branches comprising a first pair of serially connected resistors, the other of said branches comprising a second pair of resistors and a resistor of a potentiometer connecting said second pair of resistors in series, means connected across each of said branches to apply a varying unidirectional voltage thereto, means to connect said component in shunt with one resistor of said first pair of resistors, said one resistor having a smaller value of resistance than the absolute value of minimum negative resistance of said component, means connecting the common junction of said first pair of resistors to one terminal of said two horizontal-deflection input terminals and to one terminal of said two vertical-deflection input terminals of said oscilloscope, means connecting the tap of said potentiometer to the other terminal of said two vertical-deflection input terminals, and means connecting said voltage applying means to the other terminal of said two horizontal-deflection input terminals, whereby said oscilloscope can display the curve of said characteristic.

6. A curve-tracing circuit as defined in claim 5 wherein the algebraic sum of the conductances of said component and of said one resistor is always greater than zero.

References Cited in the file of this patent

UNITED STATES PATENTS 2,162,009 Goldsmith ------------ June 13, 1939